Oct. 11, 1966 R. M. PITTS ET AL 3,278,753
UNDERWATER DETECTION SYSTEM
Filed June 4, 1963 2 Sheets-Sheet 1
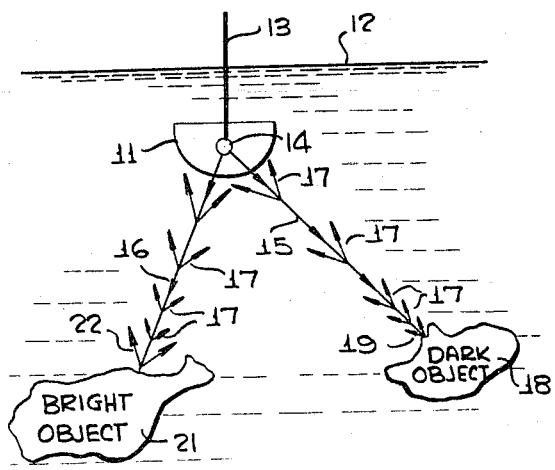
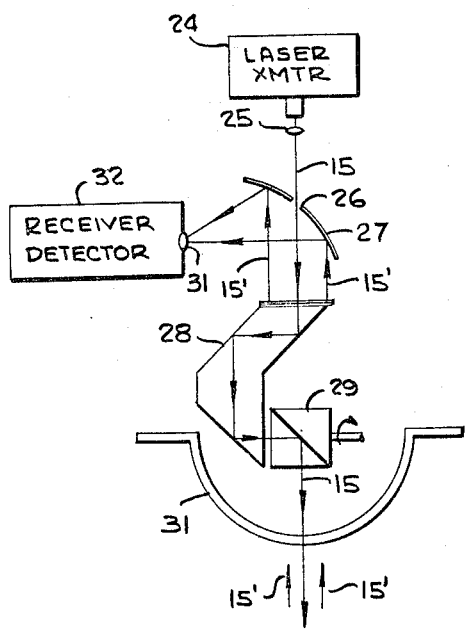
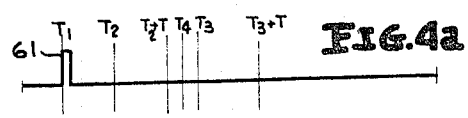
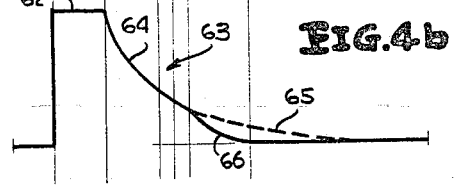
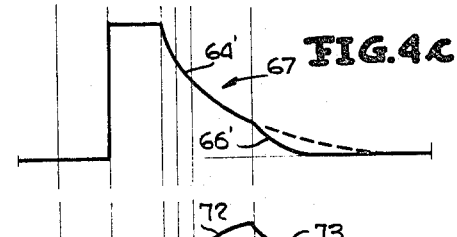
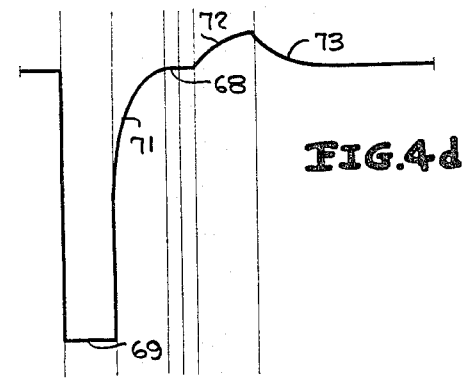
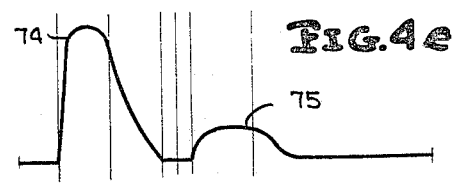
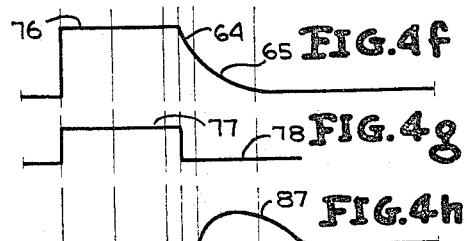
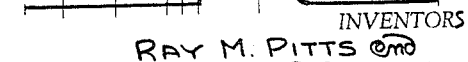
INVENTORS
RAY M. PITTS and
BLANCHARD D. SMITH, Jr.
BY Hurwitz & Rose
ATTORNEYS United States Patent Office 3,278,753
Patented Oct. 11, 1966

3,278,753
UNDERWATER DETECTION SYSTEM
Ray M. Pitts, Arlington, and Blanchard D. Smith, Jr., Alexandria, Va., assignors to Melpar, Inc., Falls Church, Va., a corporation of Delaware
Filed June 4, 1963, Ser. No. 285,475
5 Claims. (Cl. 250—218)

The present invention relates generally to systems for detecting underwater objects and more particularly to an underwater detection system wherein light backscatter is utilized to detect the presence of an object.

With the advent of coherent light sources, i.e. lasers, the possibility of underwater object detection with light energy has seemingly been attained because of the ability to distinguish and detect such light from ambient, non-coherent light energy. Others who have experimented with coherent light for underwater detection, however, have been plagued by noise introduced by backscatter. Backscatter results in response to reflections of the propagated beam from the millions of objects and particles subsisting in an underwater environment.

Our investigations have led to the finding that backscatter can be advantageously utilized in underwater object detection. When a beam of light is propagated through the water backscatter to the transmitting point decreases exponentially as a function of distance. If the beam encounters an object, however, backscatter increases or decreases from its normal amplitude, depending upon the reflectivity characteristics of the object.

According to the present invention, object detection is accomplished by comparing received backscatter resulting from a pulse of coherent light with a backscatter pattern following the normal exponential characteristic. The comparison is effected by delaying the received exponentially decaying wave and subtracting its amplitude from the undelayed wave. Prior to subtraction, the wave amplitudes are adjusted to be equal under normal backscatter conditions when no target is encountered. Since the delayed wave has the same shape and amplitude as the received wave, the subtraction process results in a zero output if no object is encountered. When an object intercepts the propagated light pulse, resulting in lesser or greater backscatter than usual, the waves supplied to the subtractor are of unequal amplitude. The resulting non-zero output from the subtractor is applied to a detector that indicates the presence and location of the object by utilization of techniques similar to those known in the radar art.

To aid in the accurate determination of backscatter changes whereby the undesirable effects of noise associated with backscatter close to the light source are avoided, the subtractor output is gated off until backscatter level reaches a predetermined, low amplitude. The low amplitude is derived because the beam has (1) propagated to a distance where backscatter to the receiver drops below a certain level or (2) encountered a non-reflective object in proximity to the transmitter. Hence, non-reflecting objects, usually the most difficult to locate, are detected at all ranges while reflecting objects are detected only at distances fairly remote from the transmitter and receiver.

An object of the present invention is to provide a new and improved underwater detection system wherein light is utilized.

It is an additional object of the present invention to provide a system for detecting underwater objects by relying upon backscatter characteristics of transmitted light energy.

Another object of the present invention is to provide a system for locating underwater objects by comparing the light backscatter pattern detected in an area being investigated with a normal backscatter pattern.

A further object of the present invention is to provide a system utilizing light for detecting underwater objects wherein noise usually introduced by backscatter in proximity to the light source does not adversely effect object location indications.

Still another object of the present invention is to provide a system for determining if a wave having a predetermined characteristic deviates from said characteristic.

The above and still further objects, features and advantages of the present invention will become apparent upon consideration of the following detailed description of one specific embodiment thereof, especially when taken in conjunction with the accompanying drawings, wherein:

FIGURE 1 is a diagrammatic illustration showing the concepts of the present invention;

FIGURE 2 is a schematic illustration of the scanning apparatus employed in the present invention;

FIGURES 4a–4h are wave forms utilized to assist in understanding the apparatus of FIGURE 3.

Figure 3:
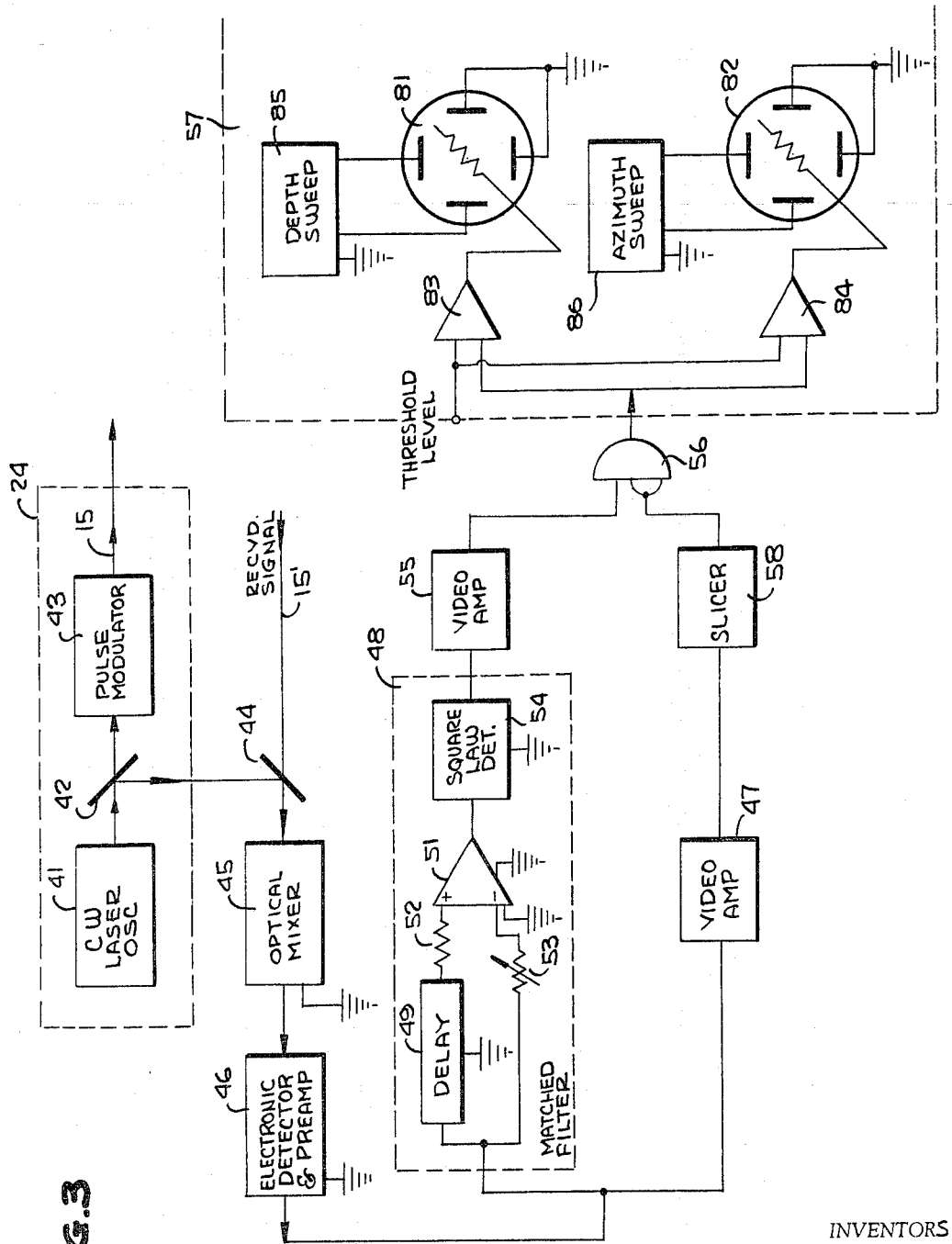
FIGURE 3 is a block diagram of a preferred embodiment of the present invention.

Reference is now made to FIGURE 1 of the drawings wherein light transparent container 11 is submerged below water level 12 and is attached to a station (not shown) above or below the water by cable 13 having suitable conductors for electrically connecting the station with container 11. Located within container 11 is laser 14, a source of coherent light pulses having a carrier frequency at which sea water attenuation is as low as possible. The light beams 15 and 16 from laser 14 are transmitted through the water and scanned to cover the entire area of interest by the apparatus of FIGURE 2, discussed infra.

Because of absorption, light waves 15 and 16 are attenuated exponentially as a function of distance from source 14. Due to the interaction of the transmitted wave with the water, backscatter towards the source occurs, which backscatter is at the same frequency as the transmitted wave and is directly proportional to the intensity of the beam at any point. Hence, there is a great degree of backscatter coupled back to container 11 at close range and little backscatter at greater distances from source 14, as depicted by arrows 17. When light beam 15 is intercepted by dark object 18 there is considerable absorption, and a noticeable decrease in backscatter as depicted by arrows 19, resulting in a backscatter deviation from the normal exponential variation. The resulting decrease in backscatter is detected by an optical receiver for the wavelength of interest within container 11 to provide a location indication for target 18.

As light from laser 14 continues to sweep the area being observed, bright object 21 having significant reflecting properties is encountered. This causes greater backscatter than usual and an increase in light energy detected, the increased backscatter being shown by the length of arrows 22. The increased backscatter characteristic is utilized at the receiver to provide a location indication of object 21. Of course the location indications are derived by measuring the time interval between the generation of the transmitted pulse and detection of the backscatter deviation.

Reference is now made to FIGURE 2 of the drawings wherein the optical apparatus employed for deriving the swept, transmitted beam and the received annular beam is disclosed. Light pulses from laser transmitter 24 are focused by lens 25 on aperture 26 in spherical reflector 27, the lens being utilized to control the size of transmitted beam 15. Light from aperture 26 is transmitted through prism 28 that rotates slowly about its vertical axis to provide an azimuth scan of light beam 15 for the area investigated. The transmitted light beam is reflected at the surfaces of prism 28 and is coupled to prism 29 where it is reflected at an internal surface to propagate through glass dome 31. Prism 29 is rotated at high speed to achieve complete vertical plane light scanning in a very small percentage of the time necessary to achieve azimuth scan.

In response to backscatter from transmitted light wave 15, backscatter waves 15' are derived. Because there is no focusing of backscatter, waves 15 and 15' do not have coincident spatial positions, hence backscatter 15' is coupled back to reflector 27 via prisms 28 and 29, generally at points distinct from aperture 26. From spherical reflector 27, backscatter waves 15' are directed onto lens 31, from whence they are supplied to receiver-detector 32, one part of which is within container 11 and the other in the monitoring station (not shown).

Reference is now made to FIGURE 3 of the drawings wherein transmitter 24 comprises a continuous source of coherent light, laser oscillator 41. Light from oscillator 41 propagates through half silvered mirror 42 to pulse modulator 43 so that short duration beams 15 of coherent light are derived from the transmitter and fed to lens 25, FIGURE 2.

Light reflected from mirror 42 is fed to a further half silvered mirror 44 where it is reflected to optical mixer 45 of conventional design such as disclosed in the paper presented by C. F. Luck et al. to the North East Electronic, Research and Engineering meeting, held in Boston, Massachusetts, in November 1961. Such a mixer includes a photomultiplier tube which is responsive to the beat frequency generated by a laser as shown in FIGURE 3 of the Luck et al. publication that heterodynes the waves applied to it. Mixer 45 is also responsive to backscatter beam 15', coupled thereto through mirror 44 so the mixer derives an output having a frequency equal to the beat frequency of the carrier frequencies of the transmitted and received waves and an amplitude proportional to the level of backscatter wave 15'. The advantage in utilizing coherent waves lies in the inherent filtering thereof by the heterodyning process. Without coherent wave transmission and reception, the random light energy in the water at the transmitted frequency would mask the received signal to probably prevent its detection.

From optical mixer 45 in container 11, the electric beat frequency signal is transmitted to detector and preamplifier unit 46 via cable 13. Detector 46 derives a signal that is in accordance with the envelope of the received backscatter. The signal from detector and preamplifier 46 is applied in parallel to clipping video amplifier 47, i.e. one saturated at a relatively low level, and matched filter 48, utilized to determine when a variation from normal occurs in the received signal.

Matched filter 48 comprises delay element 49, having its output coupled to the minuend input terminal of subtracting amplifier 51 via resistor 52. The subtrahend input terminal of amplifier 51 is coupled to detector 46 via variable resistor 53. The output of subtractor 51 is coupled to full wave rectifying square law detector 54, which includes a filter for removing high frequency noise spikes from the received signal.

The output of filter 48, deriving from detector 54, is applied through linear, video amplifier 55 to gate 56 that is normally open to pass the output of amplifier 55 to indicator 57. Gate 56 is closed in response to the signal from slicer 58, utilized to shape the output of amplifier 47 into waves having steep trailing edges.

To describe the operation of FIGURE 3, reference is made to the waveforms of FIGURE 4. Short duration pulse 61 having a coherent wave carrier is transmitted as light beam 15 at time $T_1$. In response to pulse 61, backscatter at a relatively large level is initially received. When light pulse 61 is still close to the transmitter, this level is high enough to saturate the preamplifier in unit 46, as represented by flat portion 62 of wave 63, FIGURE 4b, a replica of the preamplifier output.

As time progresses and the light pulse propagates away from a container 11, the amount of backscatter at receiver 32 decreases until the preamplifier comes out of saturation. When this occurs, at time $T_2$, the preamplifier output decreases exponentially, as shown by wave portion 64. If no target is encountered by the transmitted light pulse, wave portion 63 continues its exponential decay, as indicated by dotted line 65, until a constant, quiescent amplitude is attained. When dark object 18 is encountered, however, there is a subsequent, sudden decline at the receiver in the rate of backscatter decrease, at time $T_3$, as indicated by wave portion 66. Since $T_3$ is the time it takes for a light wave to travel from container 11 to object 18 and back, it is determined by the distance of the object from the container and the velocity of light in water.

To compare the amplitude of waveform 63 with a replica of the known waveform backscatter usually follows, the output of detector 46 is delayed for a time T, equal to $T_1-T_2$, by element, 49 to derive waveform 67, shown in FIGURE 4c as exponentially decaying portion 64'. By properly adjusting attenuator 53, waveforms 64 and 64' may be scaled to be of equal amplitudes subsequent to $T_2+T$ as long as no target is detected to change the shape of the undelayed wave. Mathematically this is seen by considering the expression for the output of detector 46 as $A\epsilon^{-T}$ during segment 64; where A and $\alpha$ are constants and $\epsilon$ is the natural logarithm base. When this wave is passed through delay element 49, it is expressed as $A\epsilon^{-a(t-T)} = A\epsilon^{aT}\epsilon^{-at}$. Since $\epsilon^{aT}$ is a constant, the output of delay line 49 is $K\epsilon^{-\alpha t}$, where K is another constant. By adjusting the values of K and A to be equal by means of rheostat 53, it is seen that the subtraction operation performed by amplifier 51 results in a zero value when $t \geq (T_2+T)$ if the waves applied thereto are exponential as shown by wave portion 68 in FIGURE 4d.

Prior to $(T_2+T)$ when both inputs to subtractor 51 are not exponential waves, the subtractor output comprises negative going rectangular wave 69 in the interval $T_1$ to $T_2$, followed by increasing exponential wave 71 in the interval $T_2$ to $(T_2+T)$. In the interval $(T_2+T)$, $T_3$ the subtractor inputs are equal and its output zero. At time $T_3$, when the backscatter level is detected, as indicated by wave segment 66, the positive input to subtractor 51 from the delayed channel retains its exponential shape. Hence, there is now a difference between the inputs to subtractor 51 so it derives positive going wave 72, FIGURE 4d. The output of subtractor 51 increases until time $T_3+T$, at which time the delayed input thereto begins to decrease in accordance with the detected backscatter reduction, as shown by wave segment 66'. The output of subtractor 51 then eventually returns to zero, as shown by wave segment 73.

In response to the positive and negative outputs from subtractor 51 square law detector 54 derives a pair of positive pulses 74 and 75 from which high frequency noise in the received signals is removed. Since pulse 74 is not of interest it is gated off by the channel comprising amplifier 47 and slicer 58. Amplifier 47 is driven into saturation by the large amplitude signal coupled to it and remains in this condition until time $T_4$, between $(T_2+T)$ and $T_3$, is reached, as shown by wave segment 76, FIGURE 4f. After $T_4$, amplifier 47 follows wave segments 64 and 65 applied thereto from detector 46.

In response to the saturation voltage 76 deriving from amplifier 47, slicer 58 develops a large positive voltage 77, utilized to prevent gate 56 from passing the waveform shown in FIGURE 4e. When amplifier 47 comes out of saturation, the output voltage of slicer 58 drops to zero, as shown at 78, to enable gate 56 to pass the output of amplifier 55.

If an object that causes a decrease in backscatter is intercepted prior to time $T_4$, amplifier 47 comes out of saturation because the input thereto drops below the amplifier's saturation level. This is as a result of the great backscatter drop at close range that reduces the amplifier's input below the level at which saturation occurs. Since amplifier 47 is no longer saturated, the finite, non-zero output of amplifier 55 is passed through gate 56 to provide an indication of object location. If an object causing an increase in backscatter is encountered subsequent to $T_4$, an indication of its presence generally will be given since the increased backscatter at relatively great distances is not usually sufficient to drive amplifier 47 back into saturation. The increased backscatter, resulting in a negative output from subtractor 51, has the same effect on amplifier 55 as decreased backscatter because full wave detector 54 is employed.

To provide depth and azimuth indications of the detected object, the output of gate 56 is applied in parallel to the control grids of cathode ray oscilloscopes 81 and 82, via amplifiers 83 and 84, respectively. The horizontal and vertical deflection plates of CRT's 81 and 82 are activated by depth and azimuth sweep generators 85 and 86, synchronized with the rotation of prisms 28 and 29. Whenever an object is detected, as indicated by pulse 87, FIGURE 4h, the control grid of CRT 81 is activated so a person viewing the CRT face is provided with an indication of object depth. Object azimuth indications may be derived in the same manner by observation of CRT 82.

To provide a very accurate indication of the object's location, a manually controlled threshold level for amplifiers 83 and 84 is provided. When the system is in a search mode the threshold is adjusted so that weak signals are passed to CRT's 81 and 82. When an object is detected and its location is more accurately desired, the threshold is adjusted so amplifiers 83 and 84 pass only larger voltages, thereby preventing clutter on the faces of the CRT's in response to noise.

While we have described and illustrated one specific embodiment of our invention, it will be clear that variations of the details of construction which are specifically illustrated and described may be resorted to without departing from the true spirit and scope of the invention as defined in the appended claims.

We claim:
1. A system for detecting an object in water comprising a source of coherent light energy waves;
  means for propagating pulses of said coherent light energy waves through the water;
  means for detecting the light backscatter produced by the transmission of said pulses of coherent light energy waves through the water;
  said means for detecting including optical heterodyning means responsive to the beat frequency of the transmitted light energy and detected light backscatter;
  said optical heterodyning means providing a first electrical signal having a frequency equal to said beat frequency and modulated by the magnitude of said detected light backscatter;
  electrical detector means responsive to said first electrical signal for providing a second electrical signal corresponding to said modulation;
  means for delaying said second electrical signal; and
  comparator means responsive to said second electrical signal and said delayed signal for comparing the wave forms of each of said signals to derive an output signal therefrom as a function of a difference in the shape of said waveforms in a given time interval which provides an indication of an abrupt change in the detected backscatter.

2. The system according to claim 1 wherein said comparator means includes means for adjusting the amplitudes of said second electrical signal and said delayed signal to be of equal value during said given time interval in the absence of an abrupt change in the backscatter.

3. The system according to claim 1 further comprising means responsive to said second electrical signal for deriving a D.C. voltage pulse;
  gating means having inputs responsive to the output signal of said comparator means and said D.C. voltage pulse whereby the presence of said D.C. voltage pulse prevents said comparator output signal from passing through said gating means.

4. The system according to claim 3 further comprising display means; said display means being responsive to the output signal of said comparator means which passes through said gating means.

5. In a system for detecting an object in water by detecting a variation in the normal light backscatter of transmitted pulses of coherent light energy waves,
  means for detecting backscatter derived in response to said pulses for providing an electrical signal corresponding thereto;
  means for delaying said signal;
  comparator means responsive to said signal and said delayed signal for comparing the wave forms of each of said signals to derive an output signal as a function of a difference in the shape of said signal wave forms in a given time interval whereby a change in the backscatter relative to the backscatter normally derived from said pulse is indicated; said comparator means including means for adjusting the amplitudes of said electrical signal and said delayed signal to be of equal value during said given time interval in the absence of an abrupt change in backscatter; and
  gating means for blocking said output signal when said backscatter is above a predetermined level.

References Cited by the Examiner

UNITED STATES PATENTS 2,540,827  2/1951  Mankin.
2,966,090  12/1960  Scholdstrom.
2,968,987  1/1961  Knopow _____ 250—218 X

OTHER REFERENCES

"Correlation Optical Radar" (Katzman) Proceedings of the IRE, page 1684, vol. 49, No. 11, November 1961.

"Will the Laser Succeed Sonar for Undersea Electronics," (Dalberger), pp. 24–25 Electronics, vol. 34, June 9, 1961.

RALPH G. NILSON, *Primary Examiner.*

J. D. WALL, *Assistant Examiner.*